No. 609,485. Patented Aug. 23, 1898.
L. T. WILCOX.
BURNER.
(Application filed Nov. 18, 1897.)
(No Model.) 2 Sheets—Sheet 2.
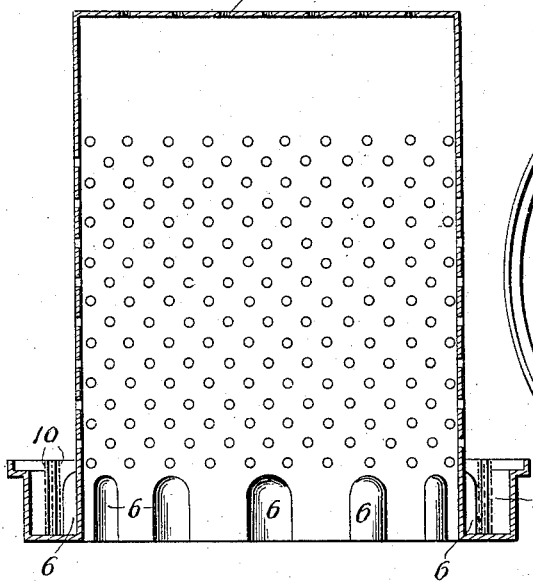
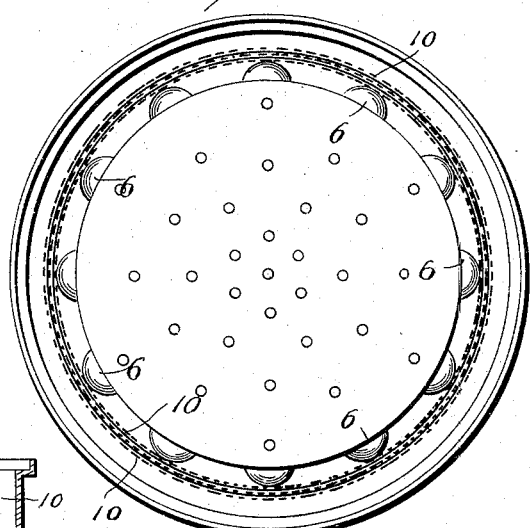
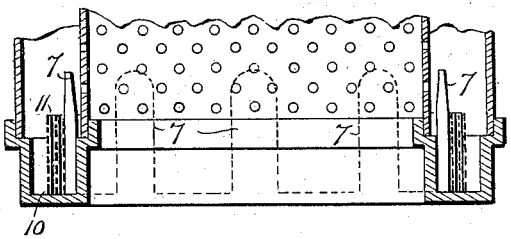
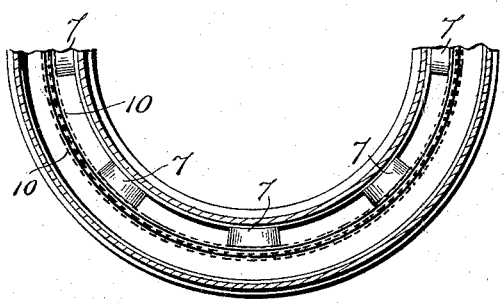
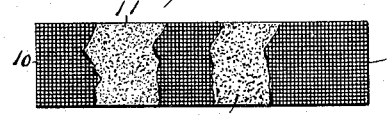
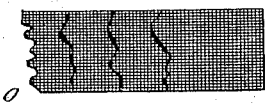
WITNESSES
INVENTOR
L. T. Wilcox
By H. A. Seymour
Attorney

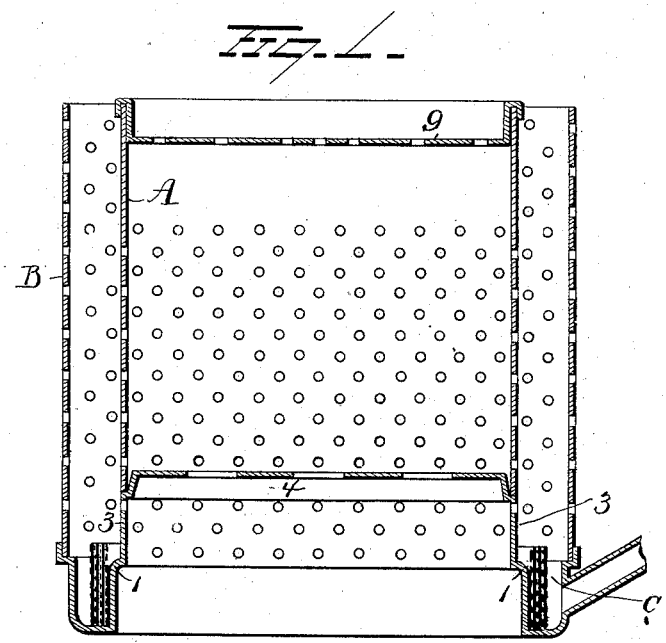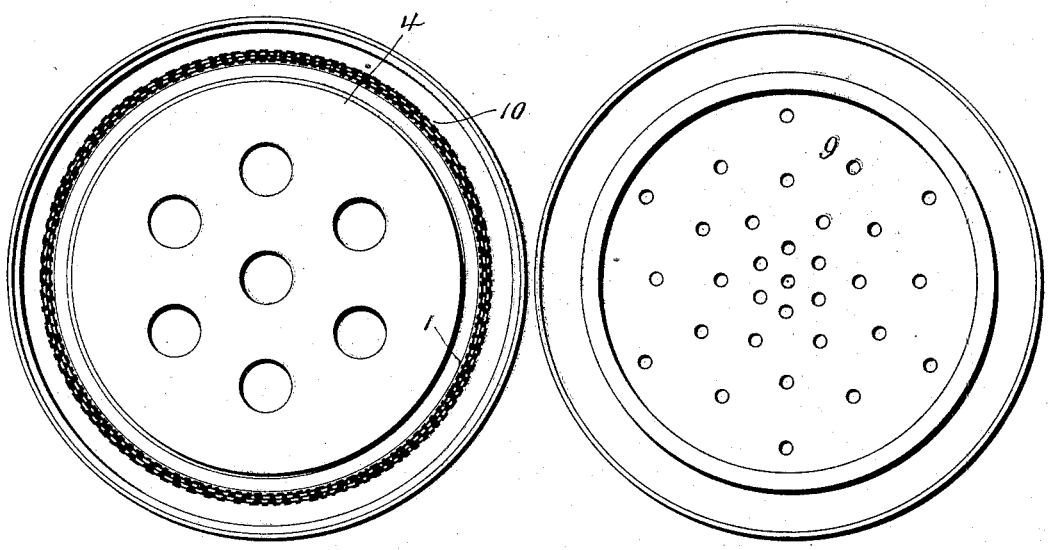

UNITED STATES PATENT OFFICE.

LEWIS T. WILCOX, OF LANSING, MICHIGAN.

BURNER.

SPECIFICATION forming part of Letters Patent No. 609,485, dated August 23, 1898.

Application filed November 18, 1897. Serial No. 658,934. (No model.)

*To all whom it may concern:*

Be it known that I, LEWIS T. WILCOX, of Lansing, in the county of Ingham and State of Michigan, have invented certain new and useful Improvements in Burners; and I do hereby declare the following to be a full, clear, and exact description of the invention, such as will enable others skilled in the art to which it appertains to make and use the same.

My invention relates to an improvement in burners to be used in stoves more particularly, and its object is to cure certain existing defects in devices of the same type; and it consists in certain novel features of construction and combinations of parts, which will be hereinafter described, and pointed out in the claims.

In the accompanying drawings, Figure 1 is a vertical section of one form of burner. Fig. 2 is a plan view of the lower portion. Fig. 3 is a view of the cap. Figs. 4 and 5 are modifications, the former being a vertical section and the latter a plan. Figs. 6 and 7 are likewise modifications, one being a vertical and the other a horizontal section; and Figs. 8 and 9 are views of my improved wick.

Referring to Fig. 1, A and B represent two concentric perforated tubes, the space between them constituting a vapor-chamber, in which the vaporized oil receives its admixture of air and ascends to the combustion-point.

C is the annular oil-chamber at bottom, into which the hydrocarbon is supplied. This oil-chamber C is intentionally of less width than the vapor-chamber immediately above for a purpose.

In the present construction it will be observed that there are no perforations below the point where the flame begins, and that the width of the oil-chamber is never greater than the width of the space between the perforated tubes. With this arrangement the flame will not burn below the top of the wick and consequently will at all times burn with a perfect blue flame. It is also desirable that the wick be held about in the center of the space between the perforated tubes. This is provided for in Fig. 1 by the swell 1, formed in the oil-chamber, the wick extending far enough above it so that ample space is formed on both sides of it. Thus the space in which the wick is located is divided, so that the tendency of the flame is to burn alike on both sides, and when the wick is first lighted the flame will burn against both the inner and outer edges of the oil-chamber.

It will be observed that the wick occupies only about one-half of the oil-chamber, and that in the construction shown in Fig. 1 the bottom of the oil-chamber slopes somewhat toward the wick, so that when the valve is opened and the oil enters the chamber it will flow against the wick and rise to the top of the latter, when it may be immediately ignited. When lighted, it will continue to burn this way for a minute or two. By that time the oil-chamber becomes so hot that when more oil strikes the bottom of the chamber it is immediately vaporized, even before it reaches the wick. The vaporization is so rapid that were it not for this open space circumscribing the wick the vapor would not be equally distributed in the burner, and the flame in consequence would burn high where the feed-pipe entered and perhaps nowhere else. With this present construction the oil acts precisely the same as cold water dropped on the flat surface of a hot stove would. The drops roll over the surface as it becomes converted into vapor. In the presence instance the oil is fed into the red-hot oil-chamber, and the expansion of the oil and vapor is so great that it forces it around the annular space in both directions from the supply-pipe. Thus the flame is the same height always all the way around, whereas without this space, as explained, the flame would be high at one point over the point of supply, while there might not be any flame on the opposite side of the burner.

Still another feature of the invention and of the utmost importance to the rapid vaporization of the oil comprises the integral perforated extension 3 of the upper inner edge of the oil-chamber. This extension reaches a point sufficiently above the initial flame, so that it becomes thoroughly heated thereby, and it being integral with the oil-chamber and of some good conductor of heat, as brass or copper, the heat therefrom is rapidly conducted downward and around throughout the walls of the oil-chamber, so that they become quickly heated to such a degree that the oil therein will become vaporized, and this vapor, mixed and intermingled with the air that is admitted through the perforations, will burn throughout the length of the vapor-chamber, and the flame will issue from the top of same. In nearly all burners made the oil-chamber and tubes are made separate, with the tubes merely resting on the chamber; but in constructions of this character it requires a long time for the oil-chamber to get sufficiently heated to vaporize the oil. In this style of burner oil accumulates while the metal is becoming heated, and as a result the burner will smoke and emit an odor until the surplus oil is burned. This extension is stamped with a perforated diaphragm 4, which has the function of holding the burner together. It also conducts heat reflected from the upper diaphragm to the oil-chamber. It likewise checks the air-draft and deflects it toward the wick. In the present construction it is so quickly heated that the oil cannot accumulate, and, furthermore, the heat is so intense that the greatest amount of vapor is generated from the oil and all the heat is obtained from the oil which is possible under any form of combustion. This feature is susceptible of modification, and two other forms are illustrated. In the construction shown in Figs. 4 and 5 the entire inner tube and oil-chamber are made integral instead of the tube merely resting upon an extension of the chamber, as in Fig. 1. This is perhaps a preferable form in the results attained to that disclosed in Fig. 1; but it cannot be made as cheaply, and hence is not as practicable. This construction differs also in the fact that instead of the swell 1 this is broken up into a series of vertical ridges 6 6. In the other modification the inner tube and oil-chamber are two separate pieces; but to get the heat to this chamber the lugs, prongs, or studs 7 7 are projected from the inner wall of the oil-chamber upward into the flame, where they derive heat therefrom and immediately conduct it down to the chamber, heating it, which is the end to be attained, said lugs, prongs, or studs 7 forming in effect extensions of said inner wall of the oil-chamber.

Referring again to Fig. 1, attention is directed especially to the perforated disk or cap 9 at the top, and more especially the arrangement of the modifications. This has a special object. Heretofore there has been formed one central perforation, with four others near the center. The objection to this arrangement of holes is that when the flame has reached the top of the tubes A and B the tendency is for the flame to come toward the center of the burner. If there is any unconsumed vapor which requires an additional supply of oxygen to complete the combustion, as this vapor drifts toward the center of the burner it will at first be consumed over small perforations near the outer edge of the cap on the tube, as it will there be supplied with oxygen. If there is a greater amount of vapor, then it will continue to drift toward the center of the cap and be consumed, and in practice with my form of construction I can get a perfect combustion with the flame burning eight or ten inches above the top of the burner, the tendency being for it to burn in the form of a perfect cone the base of which is the size of the outer perforated tube; also, there have been instances in which the entire surface of the cap has been perforated alike; but that causes too great a draft, and the tendency is to burn in a circle, although if the perforations are of the right size and number the flame will be perfectly blue, and while this prevents a dead-space over the center of the burner it does not provide a central flame, so that when a vessel is over the flame the flame will burn in a ring around the outer edge of the vessel. All this is obviated in my construction, in which I get a solid cone-shaped flame, and this is obtained by clustering several holes at the center and making them more and more scattered toward the outer edge.

A wick is not absolutely necessary, especially when the burner is used for burning benzene, gasolene, or other refined oil products which are very volatile in their nature; but generally I prefer to employ such a wick as I have illustrated. This is made of alternate layers of brass wire-cloth 10 and asbestos paper 11. It will be understood that if the entire wick is made of asbestos after it has been lighted a few times it will become brittle and the tendency will be to crumble. The wire counteracts this tendency and renders the wick practically indestructible. Again, this paper is not very porous, and after the oil is admitted into the oil-chamber it will require a few minutes to soak up to the top of the wick, so it can be lighted. This I provide for by the use of the interposed layers of wire-cloth. By means of this the oil will be drawn up by the capillary attraction very quickly—in fact, in a much less time than if the wick were made of cotton. Again, the brass cloth being a good conductor of heat, the whole wick becomes intensely heated almost immediately after lighting, which has a tendency to vaporize the oil therein, and thus it coöperates with the metal of the oil-chamber in the general results of vaporization. It is possible to make the wick of strips of wire-cloth solely without the asbestos.

Having fully described my invention, what I claim as new, and desire to secure by Letters Patent, is—

1. In a burner, the combination with an annular combustion-chamber, of an annular oil-chamber communicating therewith, a solid portion of metal forming an upward extension of the inner wall of said oil-chamber above the outer wall thereof, a wick within said oil-chamber, said wick being of such thickness as to leave an annular chamber surrounding it within the oil-chamber and of a height to extend to a point between the ends of said extension of the inner wall of the oil-chamber and an oil-inlet tube communicating with the annular chamber surrounding the wick and at a point below the upper end of said wick.

2. In a burner, the combination with an annular combustion-chamber, of an annular oil-chamber communicating with the bottom thereof, the inner wall of the oil-chamber extending above the outer wall, the lower portion of said inner wall of the oil-chamber projecting outwardly toward the outer wall, and a wick in said oil-chamber surrounding said outwardly-projecting portion of said inner wall of the oil-chamber and projecting above it, substantially as set forth.

3. In a burner, the combination with an annular combustion-chamber, of an oil-chamber communicating with the lower end thereof, the inner wall of the oil-chamber having an integral extension projecting above the outer wall, the lower portion of said inner wall disposed in a plane nearer the outer wall than said extension whereby to contract the size of the oil-chamber relatively to the combustion-chamber, a wick in the oil-chamber, and surrounding the said lower portion of the inner wall thereof, so as to leave an annular space between said wick and the outer wall of the oil-chamber, and an oil-inlet communicating with said annular space, substantially as set forth.

4. In a burner, the combination with an annular combustion-chamber, of an annular bowl communicating therewith, a wick so disposed within said bowl as to leave an annular space around it, said wick projecting above the upper end of the bowl, an extension on the bowl projecting above the wick and an oil-inlet communicating with the annular space surrounding the wick, substantially as set forth.

5. In a burner, the combination with an annular combustion-chamber, of an annular bowl communicating therewith, a wick so disposed within said bowl as to leave an annular space around it, said wick projecting above the upper end of the bowl and an extension on the bowl projecting above the wick, substantially as set forth.

In testimony whereof I have signed this specification in the presence of two subscribing witnesses.

LEWIS T. WILCOX.

Witnesses:
H. S. STANTON,
H. S. BARTHOLOMEW.